(12) United States Patent
Klum et al.

(10) Patent No.: US 9,779,148 B2
(45) Date of Patent: *Oct. 3, 2017

(54) DATA CONVERSION SYSTEM

(71) Applicant: Secured2 Corporation, Minneapolis, MN (US)

(72) Inventors: R. Daren Klum, Shoreview, MN (US); Mark Hansen, Eden Prairie, MN (US)

(73) Assignee: SECURED2 CORPORATION, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,842

(22) Filed: Jul. 13, 2015

(65) Prior Publication Data

US 2016/0012113 A1    Jan. 14, 2016

Related U.S. Application Data

(60) Provisional application No. 62/024,404, filed on Jul. 14, 2014.

(51) Int. Cl.
*G06F 17/30*    (2006.01)

(52) U.S. Cl.
CPC .. *G06F 17/30569* (2013.01); *G06F 17/30076* (2013.01); *G06F 17/30153* (2013.01)

(58) Field of Classification Search
CPC ............ G06F 17/30076; G06F 17/30153
See application file for complete search history.

(56) References Cited

U.S. PATENT DOCUMENTS

| 7,110,539 | B1 | 9/2006 | Bao et al. |
| 8,209,334 | B1 | 6/2012 | Doerner |
| 8,214,376 | B1* | 7/2012 | Jordan ............. G06F 17/30336 707/755 |
| 8,700,683 | B2 | 4/2014 | Cooney et al. |
| 2003/0188153 | A1 | 10/2003 | Demoff et al. |
| 2003/0208693 | A1 | 11/2003 | Yoshida |
| 2004/0003272 | A1 | 1/2004 | Bantz et al. |
| 2004/0049700 | A1 | 3/2004 | Yoshida |
| 2007/0136200 | A1 | 6/2007 | Frank et al. |
| 2009/0254572 | A1 | 10/2009 | Redlich et al. |
| 2009/0319536 | A1* | 12/2009 | Parker ................ H04N 21/2343 |

(Continued)

OTHER PUBLICATIONS

International search report for International application No. PCT/US2015/040155, dated Nov. 30, 2015 (4 pages).

(Continued)

*Primary Examiner* — Grace Park
(74) *Attorney, Agent, or Firm* — Hamre, Schumann, Mueller & Larson, P.C.

(57) ABSTRACT

Systems for converting data are provided. In one embodiment, a data conversion system is provided that includes a client module. The client module includes a conversion portion and an existing file segment database. The conversion portion is configured to partition a file to be converted into a plurality of file segments. The existing file segment database portion is configured to store one or more existing file segments and one or more key values, each of the one or more key values associated with one of the one or more existing file segments. The conversion portion is also configured to assign a key value to each of the plurality of file segments and to create a key value file with the assigned key values.

20 Claims, 3 Drawing Sheets

(56) References Cited

U.S. PATENT DOCUMENTS

| | | |
|---|---|---|
| 2009/0327751 A1 | 12/2009 | Koifman et al. |
| 2010/0246819 A1 | 9/2010 | Candelore |
| 2011/0276576 A1* | 11/2011 | David ................. H04L 12/5835 707/746 |
| 2012/0159175 A1 | 6/2012 | Yocom-Piatt et al. |
| 2012/0203990 A1 | 8/2012 | Konig |
| 2013/0097246 A1 | 4/2013 | Zifroni et al. |
| 2013/0103658 A1 | 4/2013 | Travis |
| 2014/0013112 A1 | 1/2014 | Cidon et al. |
| 2016/0012063 A1 | 1/2016 | Klum et al. |
| 2016/0012064 A1 | 1/2016 | Klum et al. |

OTHER PUBLICATIONS

Written opinion for International application No. PCT/US2015/040155, dated Nov. 30, 2015 (5 pages).

* cited by examiner

DATA CONVERSION SYSTEM

FIELD

Embodiments of this disclosure relate generally to data conversion. More specifically, the embodiments relate to a system for data conversion.

BACKGROUND

Many of today's markets like financial, legal, military, education, entertainment and medical are all seeing their data grow exponentially. The market has coined the term "big data" to explain the rise of large databases and the growing amount of data being driven by every industry. The growing trend to maintain large amounts of structured and unstructured data is largely led by growing Governmental regulations and compliances. These factors are leading to the explosive growth of the cloud and data storage technologies. Also, with the prevalence of big data, it becomes increasingly important to compress the data to allow for more efficient storage and quicker transmission of the data over both public and private networks.

SUMMARY

Systems for converting data are described that can be used in a number of applications including, but not limited to, secure transmission of data from one location to another, secure data backup, and general data storage.

In particular, the embodiments described herein provide data conversion by: identifying patterns in a data file, assigning a code or key value to each of these patterns, building a library of codes or key values of which each code or key value is associated with a unique pattern, replacing the data file with a key value file made up of the codes or key values, and compressing and/or encrypting the key value file.

In one embodiment, a data conversion method is provided. The data conversion method includes partitioning the data file into a plurality of file segments. The data conversion method also includes assigning a plurality of key values for each of the plurality of file segments. Also, the data conversion method includes forming a key value file from the plurality of key values.

In another embodiment, a data conversion system is provided. The data conversion system includes a client module. The client module includes a conversion portion and an existing file segment database. The conversion portion is configured to partition a file to be converted into a plurality of file segments. The existing file segment database portion is configured to store one or more existing file segments and one or more key values, each of the one or more key values associated with one of the one or more existing file segments. The conversion portion is also configured to assign a key value to each of the plurality of file segments and to create a key value file with the assigned key values.

In yet another embodiment, a data conversion device is provided. The data conversion device includes a conversion portion and an existing file segment database portion. The conversion portion is configured to partition a file to be converted into a plurality of file segments. The existing file segment database portion is connected to the conversion portion. Also, the existing file segment database portion is configured to store one or more existing file segments and one or more key values, each of the one or more key values associated with one of the one or more existing file segments. The conversion portion is also configured to assign a key value to each of the plurality of file segments and to create a key value file with the assigned key values.

DETAILED DESCRIPTION

The following description describes systems for converting data. The described systems can be used in a number of applications including, but not limited to, secure transmission of data from one location to another and secure data backup.

In particular, the embodiments described herein provide data conversion by: identifying patterns in a data file, assigning a code or key value to each of these patterns, building a library of codes or key values of which each is associated with a unique pattern, replacing the data file with a key value file made up of the codes or key values, and compressing and/or encrypting the key value file. The embodiments described herein allow the size of a file to be reduced significantly. This can lead to an increased data transmission rate and an increased storage capability, as the converted data files being transmitted or stored are significantly smaller than the data files they replace.

Figure 1:
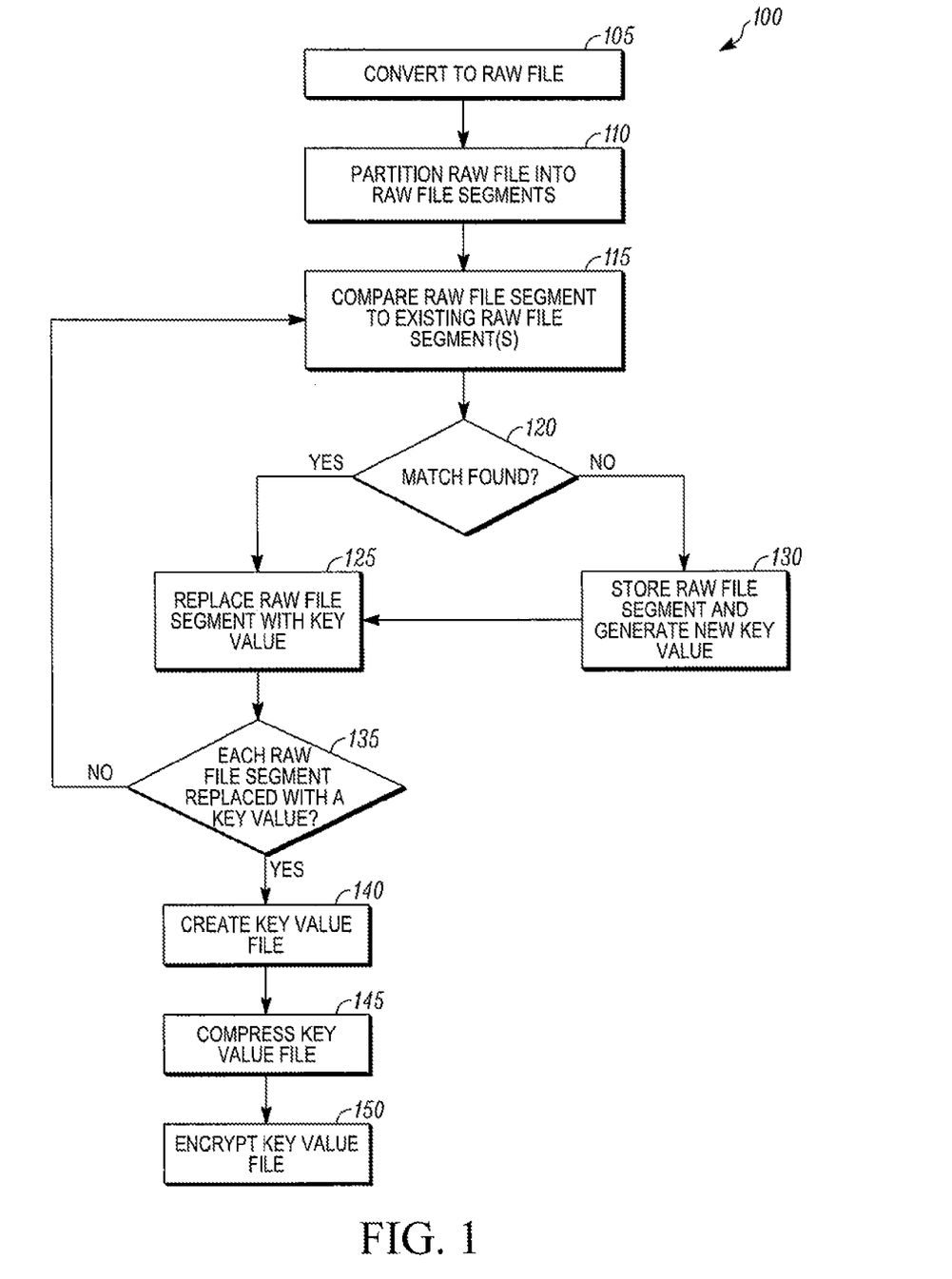
FIG. 1 is a flow chart of a data conversion method described herein.

With reference to FIG. 1, a data conversion method 100 that can be implemented by one or more computer devices is illustrated. In some embodiments, the data conversion method 100 can be performed by a single computer device. In other embodiments, portions of the data conversion method 100 can be distributed amongst a plurality of computer devices (as described below with respect to FIG. 2).

At 105 a file to be converted is converted into a raw file. As discussed herein, a raw file is a file of raw data that is a lower level of data than the data stored in the file to be converted. In some embodiments, the lower level of data can be a cross global data format such as, for example, a binary code format. In other embodiments, the lower level of data can be a data format that may not be a cross global format such as, for example, an American Standard Code for Information Interchange (ASCII) data format.

In some embodiments, when a file is to be converted, the file (regardless of the file format type) can be converted into, for example, a binary code file. For example, in some embodiments, the data in the file to be converted can be converted into a data file with binary code data.

In some embodiments, the raw file can be compressed using, for example, an industry standard compression process prior to the data conversion method 100 proceeding to 110.

At 110, the data in the raw file is partitioned into a plurality of raw file segments. In some embodiments, when the raw file is a binary code file, the plurality of raw file segments can be binary strings. The raw file can be partitioned based on a variable size delimiter and/or a fixed size delimiter. A variable size delimiter can be, for example, at every space or gap in the raw file or a data pattern in the raw file is recognized (e.g., when a string of data matches en existing raw file segment stored in a reference library or a reference library database). A fixed size delimiter can be, for example, after every X number of bytes (where X can be a predetermined number set, e.g., by the user, the computer device, etc.). In yet some other embodiments, the embodiments listed above can be combined such that the raw file can be partitioned, for example, at every space or gap in the raw file, or after every X number of bytes when a space or gap is not found in the X number of bytes.

When the raw file is a binary code file, the binary code file can be segmented into binary strings based on a variable size delimiter (e.g., a recognized binary string pattern) or based on a fixed length delimiter (e.g., a fixed length string into a base-64 compliant binary string).

At 115, a raw file segment is compared to existing raw file segment(s) stored in a reference library of a raw file segment database to see if the raw file segment matches an existing raw file segment. In some embodiments, the raw file segments can be stored in a shared model database. In other embodiments, the raw file segment database may store multiple reference libraries with each reference library provided for a particular file type. For example, the raw file segment database may include a text file reference library, a video file reference library, an application file reference library, etc.

If a match is found at 120, the data conversion method 100 proceeds to 125. At 125, the raw file segment is replaced with a key value corresponding to the existing raw file segment and stored in the raw file segment database. A key value, as discussed herein, refers to a code or value having a size less than or equal to the size of the existing raw file segment. For example, in some embodiments, the key value can be a numerical value such as, for example, a hexadecimal value. In other embodiments, the key value can be a non-numerical value such as, for example, an ASCII value. The key value is stored as part of a key value file. The data conversion method 100 then proceeds to 135.

If a match is not found at 120, the data conversion method 100 proceeds to 130. At 130, the raw file segment is stored in the raw file segment database and a new key value is assigned to the raw file segment. In some embodiments, the key value associated with an existing raw file segment can be changed based on, for example, the frequency that an existing raw file segment is used. For example, if an existing raw file segment is determined to be frequently used, the key value stored in the raw file segment database can be changed to a smaller size key value. The data conversion method 100 then proceeds to 125.

At 135, the data conversion method 100 determines whether a key value has been assigned to each of the raw file segments partitioned from the raw file. If so, the data conversion method 100 proceeds to 140. If not, the data conversion method 100 proceeds back to 115 where another raw file segment partitioned from the raw file is compared to the raw file segment database to see if this raw file segment matches an existing raw file segment stored in the reference library of the raw file segment database.

At 140, each of the raw file segments from the raw file is replaced with their corresponding key values and the corresponding key values are combined to create a key value file. While the key value file in this embodiment is created after a key value is assigned to each of the raw file segments, it is appreciated that in other embodiments the key value file can be updated while a key value is assigned to each of the raw file segments.

At 145, the key value file undergoes a compression process to create a compressed key value file. In some embodiments, the compression process can be an industry standard compression process such as, for example, a gzip conversion technique.

At 150, the converted key value file undergoes an encryption process to create an encrypted key value file. In some embodiments, the encryption process can be an industry standard encryption process such as, for example, a hashing encryption process, a symmetric encryption process, an asymmetric encryption process, etc. For example, in some embodiments, the encryption process can be a data encryption standard (DES) process, an advanced encryption standard (AES) process, a proposed encryption standard, etc. It will be appreciated that in some embodiments, the key value file can undergo the encryption process at 150 prior to undergoing the conversion process at 145.

As an example, a text file of the English nursery rhyme "Humpty Dumpty" can be converted by a computer device using the data conversion method 100 as follows.

In this example, a memory portion of the computer device includes a text reference library of common words and their respective key value. A portion of the text reference library is shown in Table 1 below.

TABLE 1

| File Segment | Key Value |
| --- | --- |
| "a" | 1 |
| "again" | 20 |
| "all" | 12 |
| "and" | 6 |
| "couldn't" | 112 |
| "fall" | 84 |
| "great" | 93 |
| "had" | 31 |
| "horses" | 105 |
| "king's" | 152 |
| "men" | 48 |
| "on" | 18 |
| "put" | 59 |
| "sat" | 62 |
| "the" | 2 |
| "together" | 44 |
| "wall" | 87 |

In this example, the computer device converts the text file into a raw file that includes only the text within the raw file (105), as shown below:

Humpty Dumpty sat on a wall. Humpty Dumpty had a great fall. All the king's horses and all the kings men couldn't put Humpty together again.

While not provided in this example, it will be appreciated to one skilled in the art that in some embodiments the raw file can be compressed before proceeding further.

The computer device then partitions the text of the raw file by separating out each word (110). Each word is then compared to the text reference library (115). For each match the corresponding key value is obtained (120). The computer device uses the key values to create a key value file that is representative of the raw file, as shown below (125).

Humpty Dumpty 62 18 1 87. Humpty Dumpty 31 193 84. 12 152 105 6 12 2 152 48 112 59 Humpty 44 20.

When the computer device determines that the text reference library does not have a match for the terms "Humpty" and "Dumpty", the computer device updates the reference library with these new terms and creates a new key value for these terms (13). A portion of the updated text reference library is shown in Table 2 below.

TABLE 2

| File Segment | Key Value |
|---|---|
| "a" | 1 |
| "again" | 20 |
| "all" | 12 |
| "and" | 6 |
| "couldn't" | 112 |
| "Dumpty" | 876 |
| "fall" | 84 |
| "great" | 93 |
| "had" | 31 |
| "horses" | 105 |
| "Humpty" | 877 |
| "king's" | 152 |
| "men" | 48 |
| "on" | 18 |
| "put" | 59 |
| "sat" | 62 |
| "the" | 2 |
| "together" | 44 |
| "wall" | 87 |

The computer device uses the newly created key values to update the key value file (125), as shown below.

877 876 62 18 1 87. 877 876 31 193 84. 12 2 152 105 6 12 2 152 48 112 59 877 44 20.

Once, the computer device determines that all of the raw file segments are replaced with a key value (135), the computer device can then compress (145) and encrypt (150) the key value file.

It is appreciated that a file converted using the data conversion method 100 can be decompressed by reversing the data conversion method 100 described above. In particular, a computer device can first decrypt and decompress the key value file. The computer device can then compare each key value of the key value file with a key value stored in a reference library of a raw file segment database. The computer device can then create a raw file by replacing each of the key values with the corresponding raw file segment. The computer device can then convert the generated raw file into a data file.

Figure 2:
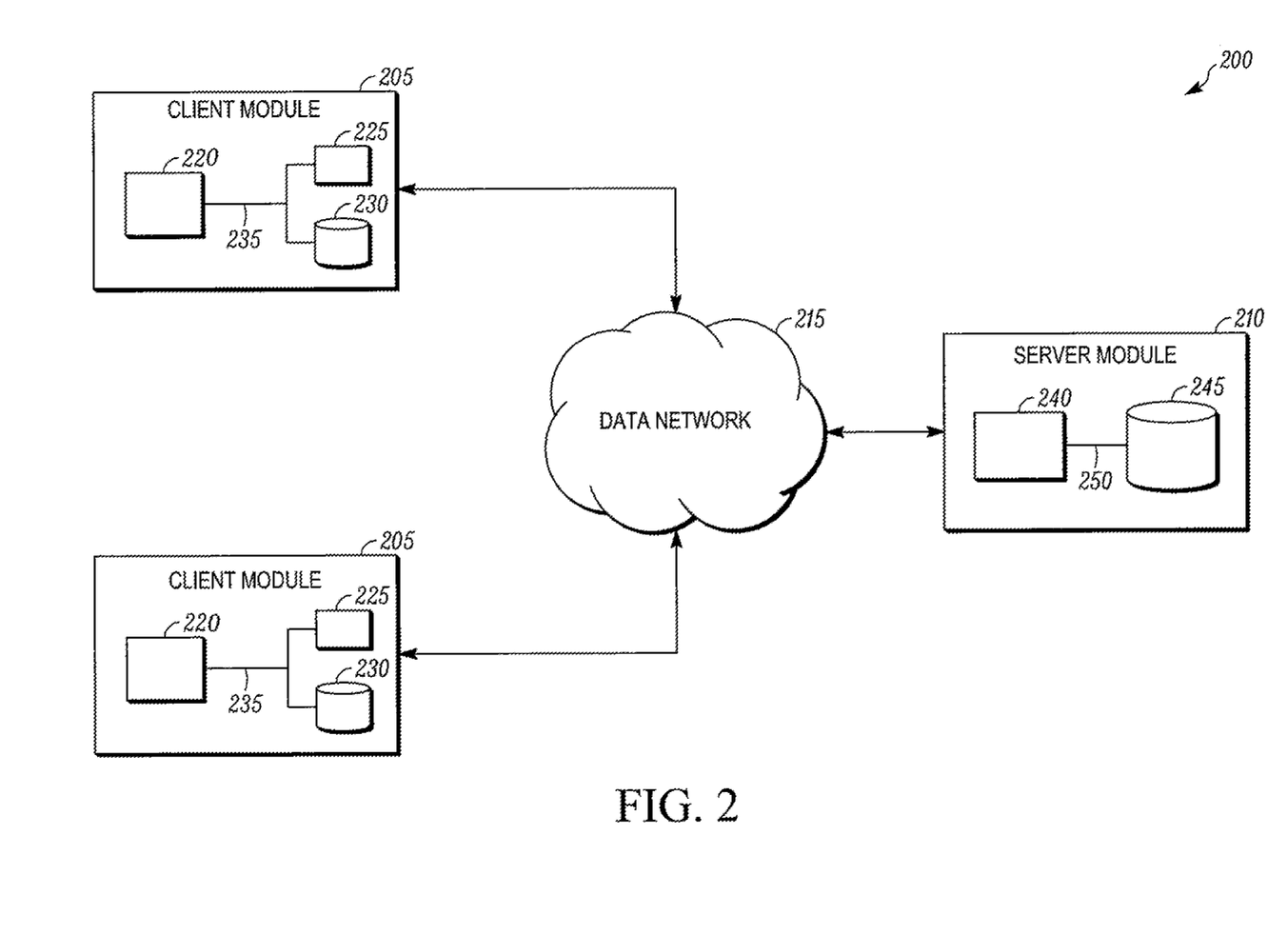
FIG. 2 schematically depicts a data conversion system described herein.

With further reference to FIG. 2, one example of a data conversion system 200 capable of implementing a data conversion method, such as the data conversion method 100 shown in FIG. 1, is illustrated. The data system network 200 includes a plurality of client modules 205 connected to a data conversion server 210 via a data network 215.

Each of the client modules 205 includes a backup portion 220 connected to a local conversion portion 225 and a local existing file segment database 230 via a connection 235. The data conversion server 210 includes a master conversion portion 240 connected to a master existing file segment database 245 via a connection 250.

In some embodiments, the client modules 205 can be a single computer device. In these embodiments, the backup portion 220 and the local conversion portion 225 can be part of a processor (not shown) and the local existing file segment database 230 can be part of a memory (not shown). The connection 235 can be a wired or wireless connection connecting the backup portion 220, the local conversion portion 225 and the local existing file segment database 230 to each other.

In other embodiments, the client modules 205 can be a distributed network of computer devices or a binary component. For example, in one embodiment, the backup portion 220 and the local conversion portion 225 can each be a server device with the local existing file segment database 230 stored in a local cache memory of the local conversion portion 225. The connection 235 can be wired network, a wireless network, or a combination thereof. When the connection 235 is a wireless network, the connection 235 can be a public network like the Internet or other wide area network (WAN), a local area network (LAN), a private network, or combinations thereof.

The data network 215 can be a wireless network, a wired network, or a combination thereof. When the data network 215 is a wireless network, the data network 215 can be a public network like the Internet or other wide area network (WAN), a local area network (LAN), a private network, or combinations thereof.

In some embodiments, the data conversion server 210 can be a single server device. In these embodiments, the master conversion portion 240 can be part of the processor of the data conversion server 210 and the master existing file segment database 245 can be part of the memory of the data conversion server 210. The connection 250 can be a wired or wireless connection connecting a processor of the data conversion server 210 to the memory storing the master existing file segment database 245.

In other embodiments, the data conversion server 210 can be a distributed network of server devices connected via a cloud-computing architecture. For example, in one embodiment, the master conversion portion 240 can be a single server device or a plurality of server devices connected via the connection 250. Also, the master existing file segment database 245 can be a single server device or a plurality of server devices connected via the connection 250. The one or more server devices that form the master conversion portion 240 and the one or more server devices that form the master existing file segment database 245 are also connected via the connection 250.

The connection 250 can be wired network, a wireless network, or a combination thereof. When the connection 250 is a wireless network, the connection 250 can be a public network like the Internet or other wide area network (WAN), a local area network (LAN), a private network, or combinations thereof.

In operation, the backup portion 220 is configured to convert a file to be converted into a raw file and send the raw file to the local conversion portion 225.

The local conversion portion 225 is configured to partition the raw file into a plurality of raw file segments. The local conversion portion 225 is also configured to work with the local existing file segment database 230 to replace each of the raw file segments with a key value.

The local existing file segment database 230 is configured to store existing raw file segments and key values. Each of the key values is associated with a particular raw file segment. Accordingly, the local conversion portion 225 can compare each raw file segment partitioned from the raw file with the plurality of existing raw file segments stored in the local existing file segment database 230. In some embodiments, the local existing file segment database 230 can be configured to only store existing raw file segments and associated key values for existing raw file segments previously used by the particular local conversion portion 225 of the client module 205.

When the local conversion portion 225 finds an existing raw file segment in the local existing file segment database 230 that matches a raw file segment partitioned from the raw file, the local existing file segment database 230 can provide a key value associated with the existing raw file segment to the local conversion portion 225. The local conversion portion 225 can then build a key value file by replacing the raw file segments with key values from the local existing file segment database 230. In some embodiments, the local conversion portion 225 can also be configured to compress and/or encrypt the generated key value file.

When the local conversion portion 225 does not find an existing raw file segment in the local existing file segment database 230, the local conversion portion 225 can communicate a request with the data conversion server 210 via the data network 215 for a key value.

The master conversion portion 240 is configured to work with the master existing file segment database 245 to determine a key value for a raw file segment sent from the client modules 205.

The master existing file segment database 245 is configured to store existing raw file segments and associate key values previously used by each of the client modules 205. The master conversion portion 240 can compare the raw file segment sent from one of the client modules 205 with the plurality of existing raw file segments stored in the master existing file segment database 245.

When the master conversion portion 240 finds an existing raw file segment in the master existing file segment database 245 that matches the raw file segment sent from one of the client modules 205, the master conversion portion 240 can send a key value associated with the existing raw file segment to the client module 205. The local existing file segment database 230 can then store the raw file segment as an existing raw file segment and store the associated key value for future use by the client module 205.

When the master conversion portion 240 does not find an existing raw file segment in the master existing file segment database 245, the master conversion portion 240 is configured to generate a new key value for the existing raw file segment and store the raw file segment as an existing raw file segment in the master existing file segment database 245 with the newly generated key value. The master conversion portion 240 is also configured to send the newly generated key value to the client module 205.

In some embodiments, the master conversion portion 240 can also be configured to receive a key value file from one of the client modules 205, compress and/or encrypt the key value file, and send the compressed and/or encrypted key value file back to the client module 205.

A data file converted using the data conversion system 200 can be used for secure transmission of data from one location to another, secure data backup, and general data storage. In particular, as the converted data file may have a significantly smaller size than the data file prior to conversion, the data conversion system 200 can increase a speed in which the content of the data file is transmitted from one location to another. The receiving location can then decompress the converted data file to obtain the content of the data file. Also, as the converted data file created by the data conversion system 200 can have a significantly smaller size than the data file prior to conversion, the data conversion system 200 can increase the amount of content provided in the data files that can be stored in a data storage or used as a data backup.

Figure 3:
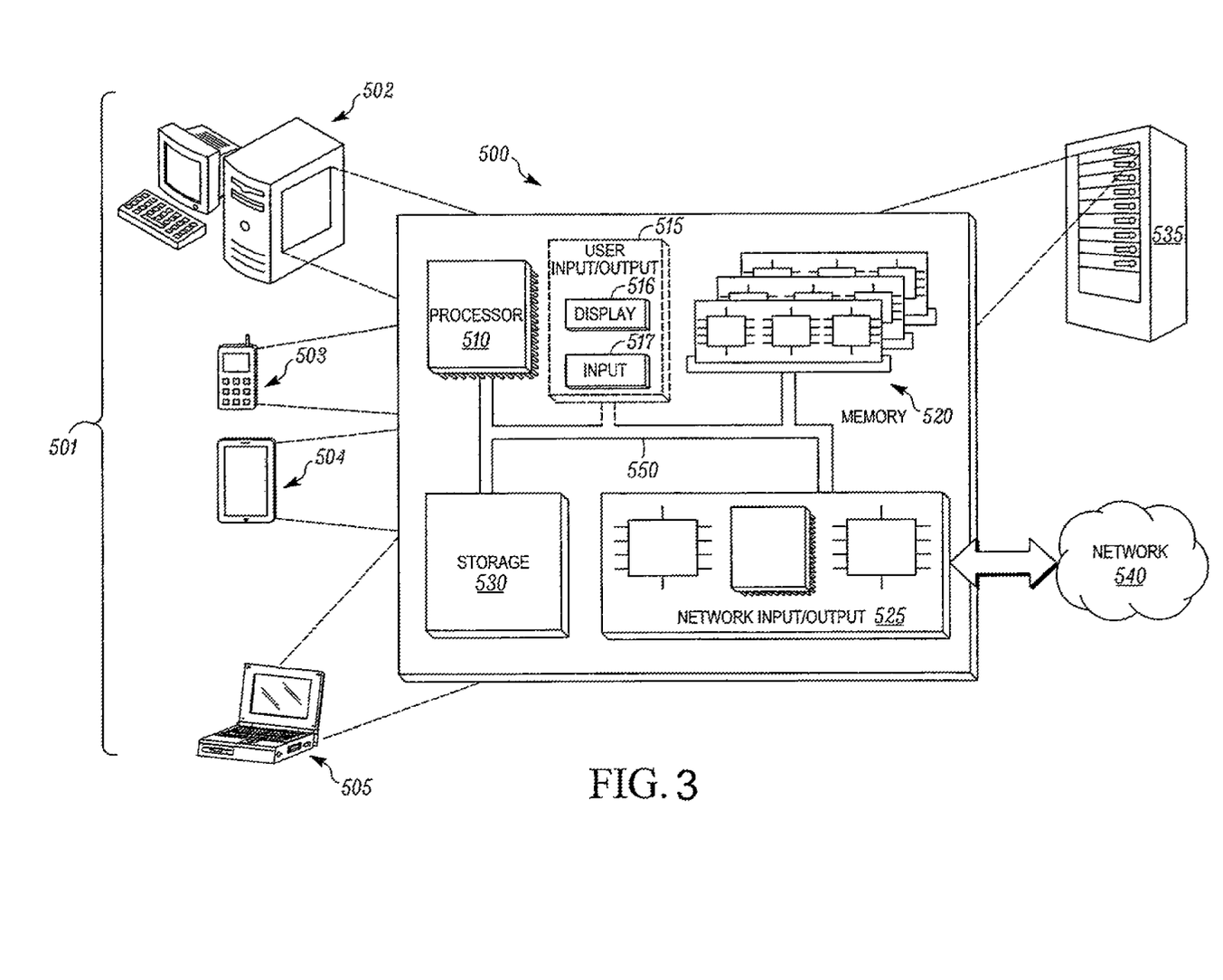
FIG. 3 schematically depicts an architecture of a computing device and computing system optionally used in connection with computer-implemented methods described in this document.

FIG. 3 is a schematic diagram of an exemplary architecture for a computer device 500, such as the one or more computer devices used as the client module 205 and the server module 210. The computer device 500 and 520 any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are exemplary and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client modules 501. In such embodiments, the client modules 501 can be in communication with the server device 535 through the network 540. One or more of the client modules 501 can be in communication with another of the client modules 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 315 can include a display 316 and/or an input 317, according to some embodiments. It is to be appreciated that the user I/O 315 can be one or more devices connected in communication with the computer device 500 that are physically separate from the computer device 500. For example, the display 516 and input 517 for the desktop computer 502 can be connected in communication but be physically separate from the computer device 500. In some embodiments, the display 316 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server device 535 can be representative of a data server, an application server, an Internet server, or the like.

Aspects described herein can be embodied as a system, method, or computer readable medium. In some embodiments, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RLA); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

Although a number of methods and systems are described herein, it is contemplated that a single system or method can include more than one of the above discussed subject matter. Accordingly, multiple of the above systems and methods can be used together in a single system or method.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A data conversion system for converting a data file, comprising a client module that includes:
    a backup portion operated by a first processor and configured to convert data stored in the data file into raw data, the raw file composed of raw data that is a lower level of data than data stored in the data file,
    a conversion portion operated by a second processor and connected to the backup portion, the conversion portion configured to partition the raw file into a plurality of raw file segments, and
    an existing raw file segment library portion that is part of a memory and configured to store one or more existing raw file segments and one or more key values, each of the one or more key values associated with one of the one or more existing raw file segments,
    wherein the conversion portion is also configured to assign a key value to each of the plurality of raw file segments and to create a key value file with the assigned key values,
    wherein the conversion portion is configured to, for each of the plurality of raw file segments, compare the raw file segment to one or more existing raw file segments stored in the existing file segment library portion,
    wherein when the raw file segment does not match any of the one or more existing raw file segments, the existing raw file segment library portion is configured to store the raw file segment, and the conversion portion is configured to create and store a key value associated with the raw file segment into the existing raw file segment library portion, and
    wherein a size of each of the plurality of key values is less than or equal to a size of the raw file segment associated with the particular key value.

2. The data conversion system of claim 1, wherein the conversion portion is configured to encrypt the key value file.

3. The data conversion system of claim 1, wherein the conversion portion is configured to compress the key value file.

4. The data conversion system of claim 1, wherein the conversion portion is configured to change a key value associated with an existing raw file segment based on a frequency of the existing raw file segment matching one of the plurality of raw file segments.

5. The data conversion system of claim 4, wherein a changed key value changed based on the frequency of the existing raw file segment matching one of the plurality of raw file segments has a smaller size than a previous key value associated with the existing raw file segment.

6. The data conversion system of claim 1, wherein the raw file composed of the raw data is in a cross global format.

7. The data conversion system of claim 6, wherein the cross global format is a binary code format.

8. The data conversion system of claim 1, wherein the raw file composed of the raw data is in an American Standard Code for Information Interchange (ASCII) data format.

9. The data conversion system of claim 1, wherein the raw file is a binary code file and the raw data is binary code data.

10. The data conversion system of claim 9, wherein the conversion portion is configured to partition the binary code file into a plurality of binary strings.

11. The data conversion system of claim 1, wherein the conversion portion is configured to partition the raw file into the plurality of raw file segments based on a variable size delimiter in which one or more of the plurality of raw file segments is segmented at a gap or space in the raw file.

12. The data conversion system of claim 1, wherein the conversion portion is configured to partition the raw file into the plurality of raw file segments based on a fixed size delimiter in which one or more of the plurality of raw file segments is segmented to have a fixed memory size.

13. The data conversion system of claim 1, wherein the conversion portion is configured to partition the raw file into the plurality of raw file segments based on a variable size delimiter in which one or more of the plurality of raw file segments is segmented at a gap or space in the raw file and on a fixed size delimiter in which the one or more of the plurality of raw file segments is segmented to have a fixed memory size when a gap or space is not present within a portion of the raw file extending along the fixed memory size.

14. The data conversion system of claim 1, wherein the existing raw file segment library portion includes a plurality of reference libraries, wherein each of the reference libraries is provided to store one or more of the existing raw file segments of a particular file type.

15. The data conversion system of claim 14, wherein the existing raw file segment library portion includes at least one of a text file reference library, a video file reference library, and an application file reference library.

16. The data conversion system of claim 1, wherein the key value is a hexadecimal value.

17. The data conversion system of claim 1, wherein the key value is an ASCII value.

18. The data conversion system of claim 1, wherein the conversion portion is configured to create the key value file after assigning a particular key value of the plurality of key values to each of the plurality of raw file segments.

19. The data conversion system of claim 1, wherein the conversion portion is configured to create and update the key value file while assigning a particular key value of the plurality of key values to each of the plurality of raw file segments.

20. The data conversion system of claim 1, wherein the first processor and the second processor are the same processor.

* * * * *